(12) United States Patent
Odhner et al.

(10) Patent No.: US 11,173,602 B2
(45) Date of Patent: Nov. 16, 2021

(54) TRAINING ROBOTIC MANIPULATORS

(71) Applicant: Righthand Robotics, Inc., Somerville, MA (US)

(72) Inventors: Lael Odhner, Medford, MA (US); Leif Jentoft, Cambridge, MA (US); Yaroslav Tenzer, Cambridge, MA (US); Mark Keck, Medford, MA (US); Robert Howe, Cambridge, MA (US)

(73) Assignee: RightHand Robotics, Inc., Somerville, MA (US)

( * ) Notice: Subject to any disclaimer, the term of this patent is extended or adjusted under 35 U.S.C. 154(b) by 278 days.

(21) Appl. No.: 16/318,098

(22) PCT Filed: Jul. 18, 2017

(86) PCT No.: PCT/US2017/042670
§ 371 (c)(1),
(2) Date: Jan. 15, 2019

(87) PCT Pub. No.: WO2018/017612
PCT Pub. Date: Jan. 25, 2018

(65) Prior Publication Data
US 2019/0358810 A1    Nov. 28, 2019

Related U.S. Application Data

(60) Provisional application No. 62/363,446, filed on Jul. 18, 2016.

(51) Int. Cl.
*B25J 9/16*        (2006.01)
*B25J 13/08*       (2006.01)
(Continued)

(52) U.S. Cl.
CPC ............. *B25J 9/163* (2013.01); *B25J 9/1697* (2013.01); *B25J 13/082* (2013.01); *B25J 13/085* (2013.01);
(Continued)

(58) Field of Classification Search
CPC ........ B25J 9/163; B25J 9/1697; B25J 13/082; B25J 13/085; B25J 15/0009; B25J 15/008;
(Continued)

(56) References Cited

U.S. PATENT DOCUMENTS

| 4,704,694 A | 11/1987 | Czemiejewski |
| 5,501,498 A | 3/1996 | Ulrich |

(Continued)

FOREIGN PATENT DOCUMENTS

| WO | WO2010122445 A1 | 10/2010 |
| WO | 2015162390 A1 | 10/2015 |
| WO | WO2016014774 A1 | 1/2016 |

OTHER PUBLICATIONS

Extended European Search Report for PCT/US2017/042670, dated Feb. 26, 2020. 9 pages.
(Continued)

*Primary Examiner* — Basil T. Jos
(74) *Attorney, Agent, or Firm* — Danielson Legal LLC (57) ABSTRACT

Methods and systems for training a robotic manipulator. The system may include one or more sensor devices and a robotic manipulator for executing an item grasping strategy to grasp an item. The system may further evaluate the item grasping strategy to determine whether the strategy was successful.

22 Claims, 6 Drawing Sheets

(51) Int. Cl.
*B25J 15/00* (2006.01)
*B25J 15/06* (2006.01)
*B25J 19/02* (2006.01)
*G06F 7/00* (2006.01)

(52) U.S. Cl.
CPC ......... *B25J 15/008* (2013.01); *B25J 15/0009* (2013.01); *B25J 15/0616* (2013.01); *B25J 19/021* (2013.01); *B25J 19/026* (2013.01); *G06F 7/00* (2013.01)

(58) Field of Classification Search
CPC .... B25J 15/0616; B25J 19/021; B25J 19/026; B25J 9/1679; B25J 5/00; G06F 7/00; Y02P 90/02; B65G 1/1373; G05B 19/4189; G05B 2219/40537; G05B 2219/40053
See application file for complete search history.

(56) References Cited

U.S. PATENT DOCUMENTS

| | | | |
|---|---|---|---|
| 8,355,816 | B2 | 1/2013 | Saito |
| 8,380,652 | B1 | 2/2013 | Francis, Jr. |
| 8,768,512 | B2 | 7/2014 | Lim et al. |
| 9,008,442 | B2 | 4/2015 | Wu et al. |
| 9,014,857 | B2 | 4/2015 | Ota et al. |
| 9,092,698 | B2 | 7/2015 | Buehler et al. |
| 9,238,304 | B1 | 1/2016 | Bradski et al. |
| 9,333,649 | B1 | 5/2016 | Bradski et al. |
| 9,434,072 | B2 | 9/2016 | Buehler et al. |
| 9,492,923 | B2 | 11/2016 | Wellman et al. |
| 9,519,882 | B2 | 12/2016 | Galluzzo et al. |
| 9,630,316 | B2 | 4/2017 | Konolige et al. |
| 9,821,458 | B1 * | 11/2017 | Watts ................. B25J 9/163 |
| 2007/0187183 | A1 | 8/2007 | Saigh et al. |
| 2008/0301072 | A1 | 12/2008 | Nagatsuka et al. |
| 2009/0306825 | A1 | 12/2009 | Li et al. |
| 2013/0151007 | A1 * | 6/2013 | Valpola ................. B25J 9/1694  700/245 |
| 2015/0057793 | A1 | 2/2015 | Kawano |
| 2015/0073589 | A1 | 3/2015 | Khodl et al. |
| 2015/0332213 | A1 * | 11/2015 | Galluzzo ................ B25J 9/1692  700/216 |
| 2016/0009493 | A1 | 1/2016 | Stevens et al. |
| 2016/0059407 | A1 | 3/2016 | Sonoda |
| 2016/0375585 | A1 | 12/2016 | Shimizu et al. |
| 2017/0028562 | A1 | 2/2017 | Yamazaki et al. |
| 2017/0050315 | A1 | 2/2017 | Henry |
| 2017/0088360 | A1 | 3/2017 | Brazeau et al. |

OTHER PUBLICATIONS

Extended European Search Report PCT/US2017/042674, dated Feb. 26, 2020. 9 pages.
Saxena, Ashutosh, et al. "Robotic Grasping of Novel Objects using Vision" The International Journal of Robotics Research, Feb. 1, 2008, Standford University, Standford, CA, 94305.
Steele, Bill, "Robots Learn to Pick Up Oddly Shaped Objects.," Cornell University, May 9, 2012 Available at https://phys.org/news/2012-05-robots-oddly.html.
Patil, Girish G. "Vision Guided Pick and Place Robotic Arm System Based on SIFT" International Journal of Scientific &Engineering Research, vol. 4, Issue 12, Dec. 2013.
"Picking Objects with Vision Guided Robots Systems" AIA Vision Online, Global Association for Vision Information, Feb. 14, 2017. Available at https://www.visiononline.org/blog-article.cfm/Picking-Objects-with-Vision-Guided-Robots-Systems/61.
Zhang, Hao et al., "DoraPicker: An Autonomous Picking System for General Objects." Available at http://arxiv.org/abs/1603.06317.
Gershgorn, Dave "Google's Robots Are Learning How to Pick Things Up" Popular Science, Mar. 8, 2016, Available at https://www.popsci.com/googles-robots-are-learning-hand-eye-coordination-with-artificial-intelligence.
International search report for PCT/US2017/042670, dated Oct. 12, 2017, 2 pages.
Written opinion from the ISA for PCT/US2017/042670, dated Oct. 12, 2017, 4 pages.
Bekiroglu, Yasemin, "Assessing grasp stability based on learning and haptic data." IEEE Transactions on Robotics, vol. 27 Issue: 3. Jun. 2011.
Wong, Lawson L.S. "Robot Grasping on the Stanford Artificial Intelligence Robot" Stanford Undergraduate Res. J 7, 59-64, May 20, 2008.
Salganicoff, Marcos "Active Learning for Vision-based Robot Grasping" Applied Science and Engineering Labs, University of Delaware. 1996.
International search report for PCT/2017/042674, dated Oct. 12, 2017, 2 pages.
Written opinion of the ISA for PCT/US2017/042674, dated Oct. 12, 2017, 4 pages.
International search report for PCT/US2015/065628, dated Mar. 29, 2016, 3 pages.
Written opinion of the ISA for PCT/US2015/065628, dated Mar. 29, 2016, 6 pages.

* cited by examiner

TRAINING ROBOTIC MANIPULATORS

CROSS REFERENCE TO RELATED APPLICATIONS

The present application is the national phase of International (PCT) Patent Application No. PCT/US2017/042670, filed internationally on Jul. 18, 2017, and claims the benefit of and priority to United States Provisional Application No. 62/363,446, filed on Jul. 18, 2016, the entire disclosure of each of which is incorporated by reference as if set forth in their entirety herein.

TECHNICAL FIELD

Embodiments described herein generally relate to systems, devices, and methods for training robotic manipulators and, more particularly but not exclusively, to systems, devices, and methods for training robotic manipulators to grasp one or more items.

BACKGROUND

Infrastructure systems such as warehouses often receive, ship, and store items. Until recently the majority of item movement was manually handled by human workers. Recently, however, these tasks have been increasingly handled by robotic devices.

These tasks may involve goods-to-picker workflows, in which some transportation device (e.g., a conveyor belt) brings a box or other container device with one or more items to a robotic picker device. The robotic picker device may then pick the item from the container and place the item in another location (e.g., in another containment for shipment to another location).

These tasks may additionally or alternatively involve picker-to-goods workflows. In these workflows items may initially be at some location within a warehouse (e.g., in boxes, on shelves, or the like). The robotic picker device may be configured with a transportation device that enables it to travel from a first location to the item's location. Once there, the robotic picker device may pick the item and take the item to another location for further processing or shipment.

These picking systems and methods are useful in distribution environments or in environments in which items need to be moved to/from various locations. These environments may include warehouse environments, retail stores, and manufacturing and assembly plants.

These robotic picking systems can cost significantly less than manual human picking. Accordingly, there is a financial benefit to using the robotic approach wherever and whenever possible. Additionally, these automated systems promote safety as there are fewer humans in the vicinity of moving machinery.

However, the development and deployment of these systems is often challenging because not all items can be reliably grasped by a robotic picking system. A need exists, therefore, for methods, systems, and devices that overcome the above disadvantages of existing systems and workflows.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of training a robotic manipulator. The method includes receiving data regarding an item from a first sensor device; generating, using a processing device executing instructions stored on a memory to provide a planning module, an item grasping strategy to be executed by the robotic manipulator to grasp the item; transmitting, to a robotic manipulator for execution, the item grasping strategy; receiving data regarding the execution of the item grasping strategy from a second sensor device; and evaluating the item grasping strategy using the planning module and the data received from at least a second sensor device.

In some embodiments, the received data regarding the item includes size data.

In some embodiments, the received data regarding the item includes shape data.

In some embodiments, the received data regarding the item includes material data.

In some embodiments, the received data regarding the item includes weight data.

In some embodiments, the method further includes altering at least one parameter of the item grasping strategy to provide a corrective item grasping strategy based on the evaluation; and transmitting, to a robotic manipulator for execution, the corrective grasping strategy. In some embodiments, the at least one parameter is selected from the group consisting of robotic manipulator position before grasping, pre-grasp manipulations, image processing technique, and response to feedback from the first sensor device.

In some embodiments, the robotic manipulator includes a robotic hand device for executing the grasping strategy.

In some embodiments, the robotic manipulator includes a suction device for executing the grasping strategy.

In some embodiments, the robotic manipulator includes an adhesive device for executing the grasping strategy.

In some embodiments, evaluating the item grasping strategy includes determining whether the robotic manipulator grasped the item.

In some embodiments, the first sensor device and the second sensor device are the same device.

In some embodiments, the method further includes iterating the steps of: transmitting, to a robotic manipulator for execution, the item grasping strategy; receiving data regarding the execution of the item grasping strategy from the second sensor device; and evaluating the item grasping strategy using the planning module and the data received from the second sensor device.

In some embodiments, the method further includes storing data regarding the success rate of the item grasping strategy in a database module.

In some embodiments, the method further includes selecting the item to be grasped based on previous grasp success rates.

In some embodiments, the method further includes selecting the item to be grasped based on at least one physical characteristic of the item.

In some embodiments, transmitting the item grasping strategy to the robotic manipulator for execution includes transmitting the item grasping strategy to the robotic manipulator for execution during a weekend.

In some embodiments, transmitting the item grasping strategy to the robotic manipulator for execution includes transmitting the item grasping strategy to the robotic manipulator for execution during an overnight period.

In some embodiments, transmitting the item grasping strategy to the robotic manipulator for execution includes transmitting the item grasping strategy to the robotic manipulator for execution during a lull period.

According to another aspect, embodiments relate to a system for training a robotic manipulator. The system includes a robotic manipulator for grasping an item; a first sensor device for gathering data regarding the item; a second sensor device for gathering data regarding the execution of the item grasping strategy; a processing device executing instructions stored on a memory to provide a planning module configured to: generate an item grasping strategy to be executed by the robotic manipulator to grasp the item, transmit the item grasping strategy to a robotic manipulator for execution; and evaluate the item grasping strategy executed by the robotic manipulator using data received from the second sensor device.

In some embodiments, the data regarding the item includes size data.

In some embodiments, the data regarding the item includes shape data.

In some embodiments, the data regarding the item includes material data.

In some embodiments, the data regarding the item includes weight data.

In some embodiments, the planning module is further configured to alter at least one parameter of the item grasping strategy based on the evaluation to provide a corrective item grasping strategy, and the robotic manipulator is further configured to execute the corrective item grasping strategy. In some embodiments, the at least one parameter is selected from the group consisting of robotic manipulator position before grasping, pre-grasp manipulations, image processing technique, and response to feedback from the first sensor device.

In some embodiments, the robotic manipulator includes a robotic hand device for executing the grasping strategy.

In some embodiments, the robotic manipulator includes a suction device.

In some embodiments, the robotic manipulator includes an adhesive device.

In some embodiments, evaluating the item grasping strategy includes determining whether the robotic manipulator grasped the item.

In some embodiments, wherein the first sensor device and the second sensor device are the same device.

In some embodiments, the robotic manipulator and the planning module are further configured to iterate the steps of generating the item grasping strategy, transmitting the item grasping strategy, and evaluating the item grasping strategy.

In some embodiments, further comprising a database module for storing data regarding the success rate of the item grasping strategy.

In some embodiments, the item to be grasped is selected based on previous grasp success rates.

In some embodiments, the item to be grasped is selected based on at least one physical characteristic of the item.

In some embodiments, the robotic manipulator executes the grasping strategy during a weekend.

In some embodiments, the robotic manipulator executes the grasping strategy during an overnight period.

In some embodiments, the robotic manipulator executes the grasping strategy during a lull period.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Various embodiments described herein relate to systems, methods, and devices for training robotic manipulators. These robotic manipulators may be located within a facility such as a warehouse facility and may be assigned various tasks related to grasping, moving, or otherwise interacting with items in the facility.

Features of various embodiments described herein may be used to train robotic manipulators such as robotic pickers or the like. For example, through training, the systems and devices described herein may learn or otherwise determine which items are suitable for robotic picking. Moreover, this training may help improve various techniques implemented by robotic manipulators and expand their operational capabilities.

Although described the in the context of warehouse facilities, features of various embodiments described herein may be implemented in any other type of environment and/or used for any other type of application in which items need to be grasped, manipulated, or otherwise moved to and/or from various locations. Features of various embodiments may be implemented in retail environments to stock shelves with goods, for example. Other applications may include government or military operations.

Figure 1:
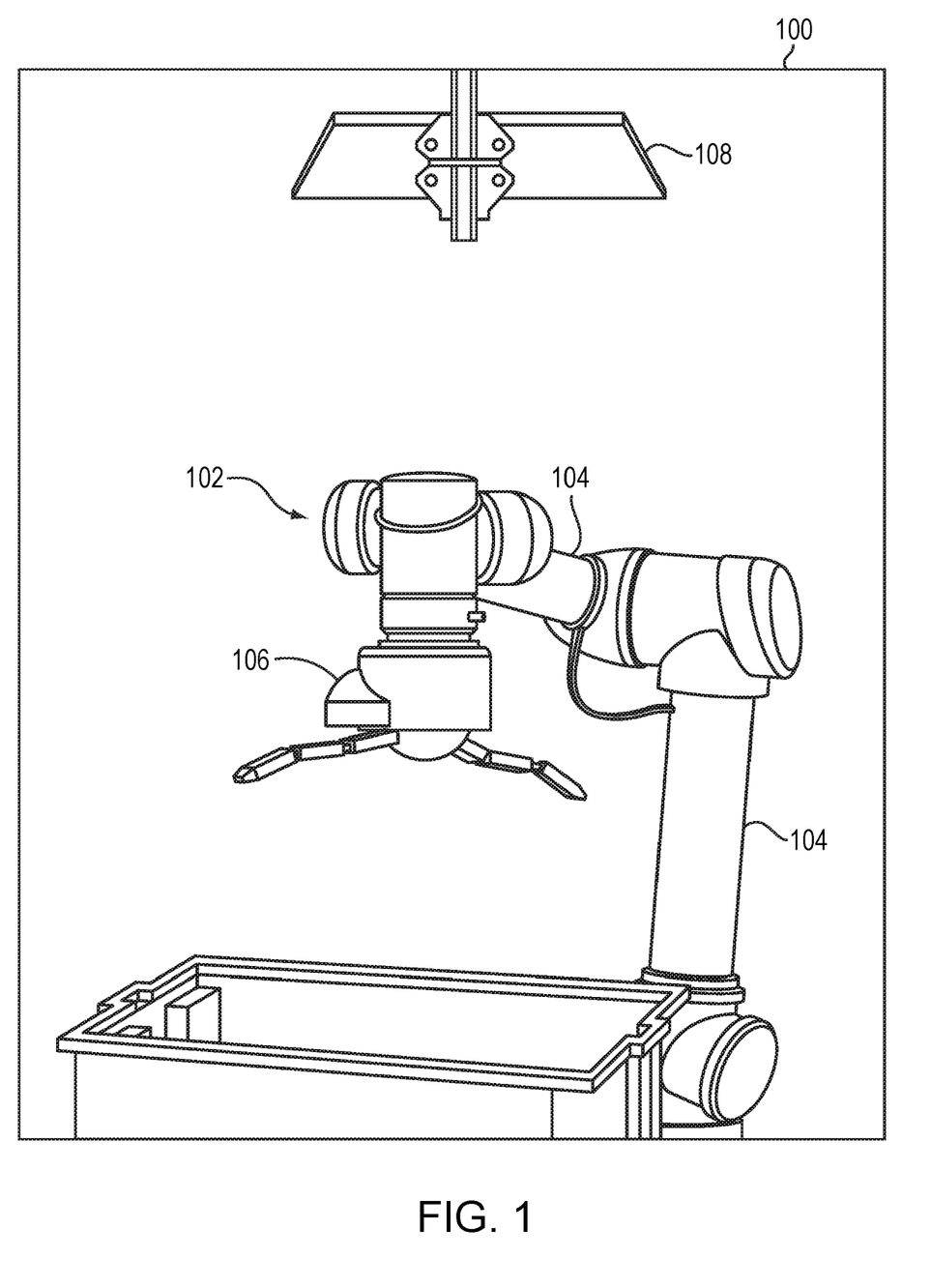
FIG. 1 presents a photograph of a robotic manipulator in accordance with one embodiment.

The robotic manipulator(s) described herein may refer to any sort of robotic device used to grasp, pick, manipulate, move, or otherwise interact with an item. In some embodiments, these robotic manipulators may include a series of arm devices controlled by one or more actuators (e.g., pneumatic or hydraulic) and/or telescoping segments that are operably configured with an end effector device to grasp an item. For example, FIG. 1 shows a photograph 100 of a robotic manipulator 102 with arm devices 104 and an end effector 106. In this embodiment, the end effector 106 may be configured as a hand device. Also, shown in FIG. 1 is a sensor device 108 for gathering imagery data regarding an item and the environment surrounding the robotic manipulator 102.

The robotic manipulator(s) may interface with an infrastructure management system to retrieve items and conduct training exercises. For example, the robotic manipulator may transmit and the infrastructure management system may receive requests for specific items for training. The infrastructure management system may respond to the request by delivering the requested item to the manipulator. The robotic manipulator may then perform one or more training exercises using the requested item (e.g., a grasp attempt on the item). The item may then be returned to its delivery location or the infrastructure management system after testing. This method therefore provides various ways for selecting the item(s) to be tested, interfacing with the infrastructure management system, performing the testing, and analyzing and leveraging the test results.

Figure 2:
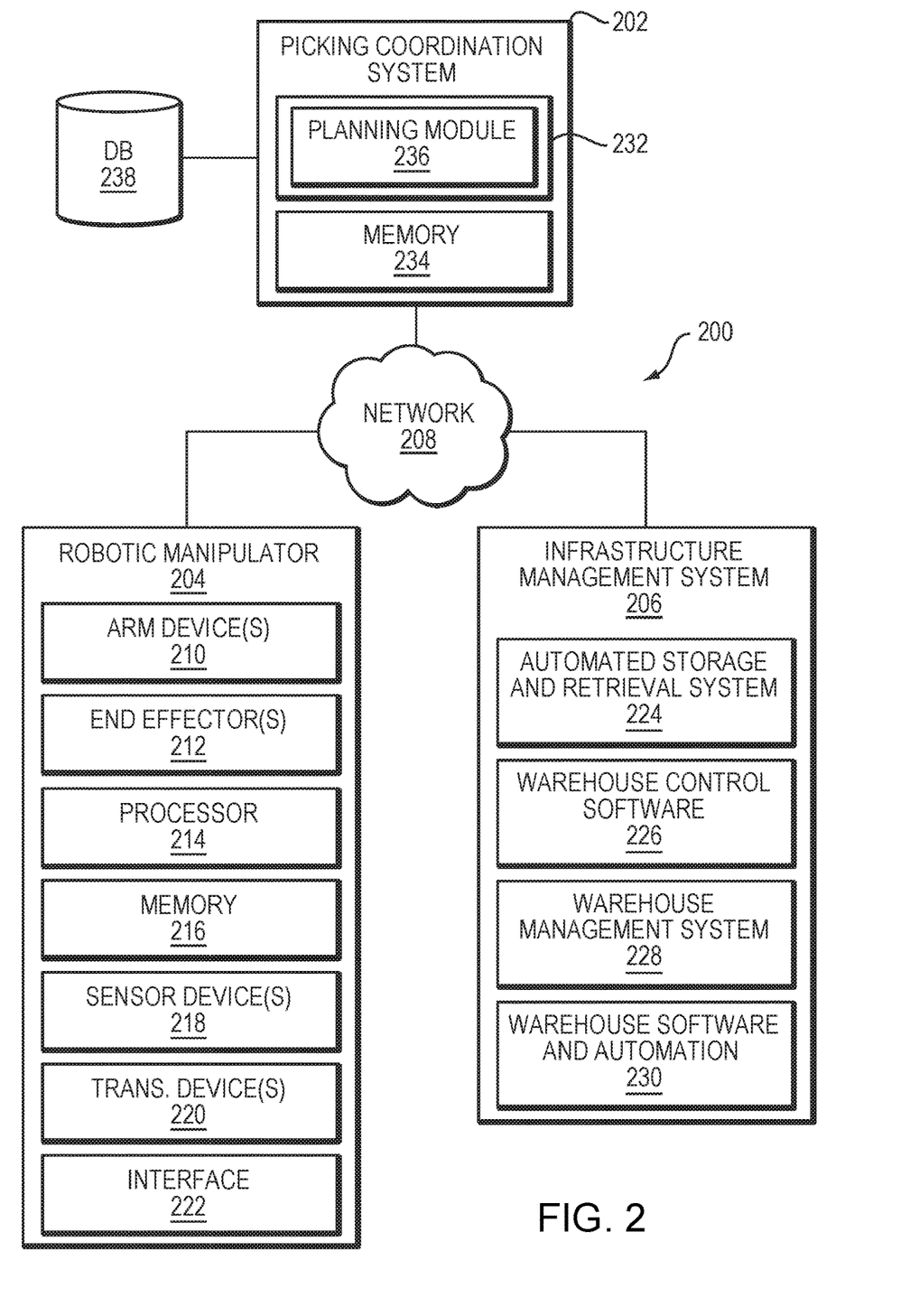
FIG. 2 illustrates a system for training a robotic manipulator in accordance with one embodiment.

FIG. 2 illustrates a system 200 for training a robotic manipulator in accordance with one embodiment. The system 200 may include a picking coordination system 202 in communication with a robotic manipulator 204 and an infrastructure management system 206 over one or more networks 208.

The network or networks 208 may link the various devices with various types of network connections. The network(s) 208 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 208 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link The picking coordination system 202 may act as a networked (e.g., cloud-based) system that monitors, instructs, supervises, and/or maintains multiple robotic manipulators 204. The picking coordination system 202 may provide any software updates when appropriate, for example, and may similarly monitor the function of the various components of the system 200. The picking coordination system 202 may also collect grasping data, sensor data, and may analyze the collected data to improve future performance of the robotic manipulator(s) 204.

The robotic manipulator 204 may be similar to the robotic manipulator 102 of FIG. 1. The robotic manipulator 204 is shown configured with one or more arm devices 210, one or more end effectors 212, a processor 214, a memory 216, sensor devices 218, transportation device(s) 220, and an interface 222.

The arm device(s) 210 may position an end effector 212 to grasp an item. The arm devices 210 may include one or more mechanically or electrically activated portions such as actuators (e.g., hydraulic or pneumatic) or telescoping segments. In these embodiments, the robotic manipulator 204 may be configured with any required reservoirs, valves, pumps, actuators, or the like.

One or more end effectors 212 may be operably attached to the arm device(s) 210. In some embodiments, such as in the photograph 100 of FIG. 1, the end effector 212 may be configured as a hand device with a plurality of "finger" portions for grasping or otherwise interacting with an item.

In other embodiments, the end effector 212 may be configured as a suction device. In these embodiments, the suction device(s) may be in operable connectivity with any required tubes, pumps, or the like to create the suction force required to grasp an item.

In other embodiments, the end effector 212 may be configured as one or more magnetic devices. In these embodiments, the robotic manipulator 204 may be configured with any required solenoids or electrical equipment to generate the magnetic force required to grasp an item. These embodiments are of course suited to those applications with items that are magnetic.

In still other embodiments, the end effector 212 may be configured with an adhesive substance or material. For example, the end effector 212 may be configured with hook-and-loop fasteners to grasp an item.

The above configurations are merely exemplary. Other types of end effectors and configurations may be used, whether available now or invented hereafter, as long as the features of various embodiments described herein can be accomplished.

The processor 214 may be any hardware device capable of executing instructions stored on memory 216 to control the robotic manipulator 204 to perform one or more grasping attempts. The processor 214 may be a microprocessor, a field programmable gate array (FPGA), an application-specific integrated circuit (ASIC), or other similar device. In some embodiments, such as those relying on one or more ASICs, the functionality described as being provided in part via software may instead be configured into the design of the ASICs and, as such, the associated software may be omitted.

The memory 216 may be L1, L2, L3 cache, RAM memory, or hard disk configurations. The memory 112 may include non-volatile memory such as flash memory, EPROM, EEPROM, ROM, and PROM, or volatile memory such as static or dynamic RAM, as discussed above. The exact configuration/type of memory 216 may of course vary as long as instructions for at least performing the grasping attempts can be executed by the processor 214.

The robotic manipulator 204 may be configured with one or sensor devices 218 to at least gather data regarding the robotic manipulator's environment including items located therein. This sensor data may include data regarding the location of an item to be grasped, the orientation of the item (e.g., whether the item is on its side, etc.), the shape of the item, the size of the item, or other data that may be helpful in executing a grasping attempt. The sensor device(s) 218 may also gather data helpful in analyzing the effectiveness or success of a grasp attempt or strategy.

In some embodiments, the sensor devices 218 may include one or more cameras such as stereo cameras or charge coupled device cameras. In other embodiments, the sensor device(s) 218 may include a LIDAR camera device operably positioned with respect to the robotic manipulator 204 and an item. In other embodiments, the sensor devices 218 may include infrared or SONAR imaging devices. The robotic manipulator 204 (namely, the processor 214) may also include or otherwise execute any required computer vision or other image processing tools.

In addition to or in lieu of image gathering devices, the sensor device(s) 218 may include pressure or piezoelectric sensor devices or appropriately positioned scales. These types of sensor devices 218 may be implemented as part of the robotic manipulator 204 (e.g., with the end effector devices 212) to measure any force caused by an item. For example, if the end effector 212 grasped the item and is holding onto an item, the force on any piezoelectric sensor(s) configured with the end effector 212 may increase to a level that indicates the end effector 212 has grasped and is holding the item. If no such force is detected, then it may be concluded that the end effector 212 did not grasp or is not holding the item.

Figure 3:
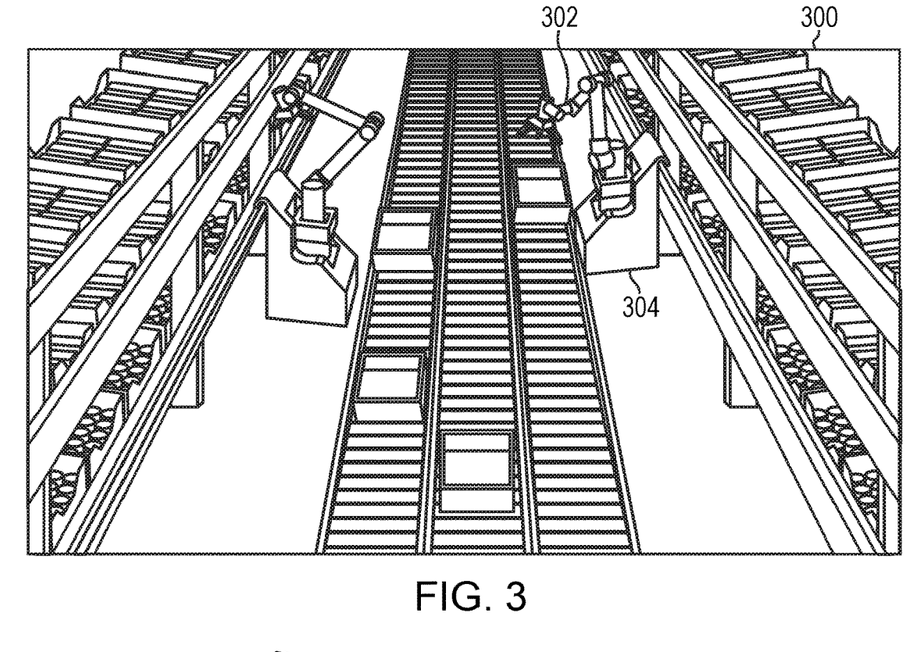
FIG. 3 illustrates a robotic manipulator in accordance with one embodiment.

The transportation device(s) 220 may enable the robotic manipulator 204 to move to and from various locations within an environment. For example, the robotic manipulator 204 may include a plurality of wheels and motors that enable it to travel within a warehouse to gather items from different locations. For example, FIG. 3 depicts a photograph 300 of a robotic manipulator 302 in an environment such as a warehouse. The robotic manipulator 302 is also seen configured with a transportation device 304. The transportation device 304 enables the robotic manipulator 302 to travel throughout the environment to grasp and gather items from various locations.

The interface 222 may enable to the robotic manipulator 204 to interface with the picking coordination system 202 and the infrastructure management system 206. This way, the robotic manipulator 204 can exchange instructions with other system components as well as provide data regarding grasp attempts.

The infrastructure management system 206 may include or otherwise execute various subsystems related to training the robotic manipulator 204 in accordance with various embodiments. These subsystems may include an automated storage and retrieval system (ASRS) 224, a warehouse control software 226, a warehouse management system (WMS) 228, and a warehouse software and automation system (WSAS) 230.

The ASRS 224 may be an automated system for moving goods that generally relies on shuttles or conveyors that are between stations where items can be loaded or unloaded.

Such systems may generally consist of a set of storage racks and a gantry with shuttle carts that move bins into and out of racks.

To access the items, the system 200 may retrieve them from the assigned storage locations and move them to an interaction location. The interaction location may be a location where the item can be picked/grasped from a box, bin, shelf, etc.

The WCS 226 may control these stations and can command the ASRS system 224 to store items for later retrieval and/or to retrieve goods from storage over an interface. The interface may be a series of logical lines, a serial port, a parallel port, or a network architecture such as CAN, Ethernet, Modbus, or the like. Additionally, identification information specific to certain items can be sent over this interface to cause the ASRS 224 to send specific items to a station or to send the items to storage.

The WCS 226 may include or otherwise execute software that controls lower-level tasks. These tasks may include receiving commands from the WMS 228 and translating them into actionable control signals for other system components. For example, the WCS 226 may issue commands such as which conveyors to turn on, where to send shuttles to retrieve containers, signals to activate interface lights, or the like.

The WMS 228 may include a software system that manages inventory and storage resources. This may generally include processing incoming orders, tracking and triggering replenishment, transporting inventory to interaction points, or the like.

The WSAS 230 may include hardware and software or otherwise execute software used to manage warehouse operation. These may include the WCS 226 and the WMS 228, as well as other automation hardware.

In some embodiments, the picking coordination system 202 may control operation of the system 200 and initiate/stop testing procedures. However, in other embodiments, an operator such as a warehouse employee may control operation of various components of the system 200. An operator may use, for example, a networked computer or a cloud-based service to issue commands.

The testing (i.e., training) procedures may take place during periods of inactivity. For example, warehouse environments may be used for active commercial distribution tasks during a certain part of the day or week. During other time periods, the warehouse may be inactive, in which there are not live logistic operations occurring.

During these periods of inactivity, the picking coordination system 202 may send requests for specific items to test to the infrastructure management system 204. Specifically, these requests may be communicated to the ASRS 224 and the WMS 228.

There may be a number of criterion or factors that may influence which item or types of items are to be tested by the robotic manipulator 204. The picking coordination system 202 may select items that have a higher-than-average grasp error rate, for example. Or, the picking coordination system 202 may select items that have not been tested within a predetermined period of time. There may be a number of different factors, considered individually or in combination that may influence which item or types of items are selected for testing.

The request may be communicated to the WMS 228. The WMS 228 may then send appropriate commands to the ASRS 224, which may then move a bin or other type of item container to an interaction point.

In the context of the present application, "interaction point" may refer to a location in which the robotic manipulator 204 executes a grasp attempt. In a "goods-to-picker" workflow, an item may be moved from a first location (such as storage) to the robotic manipulator 204 at an interaction point.

Figure 4:
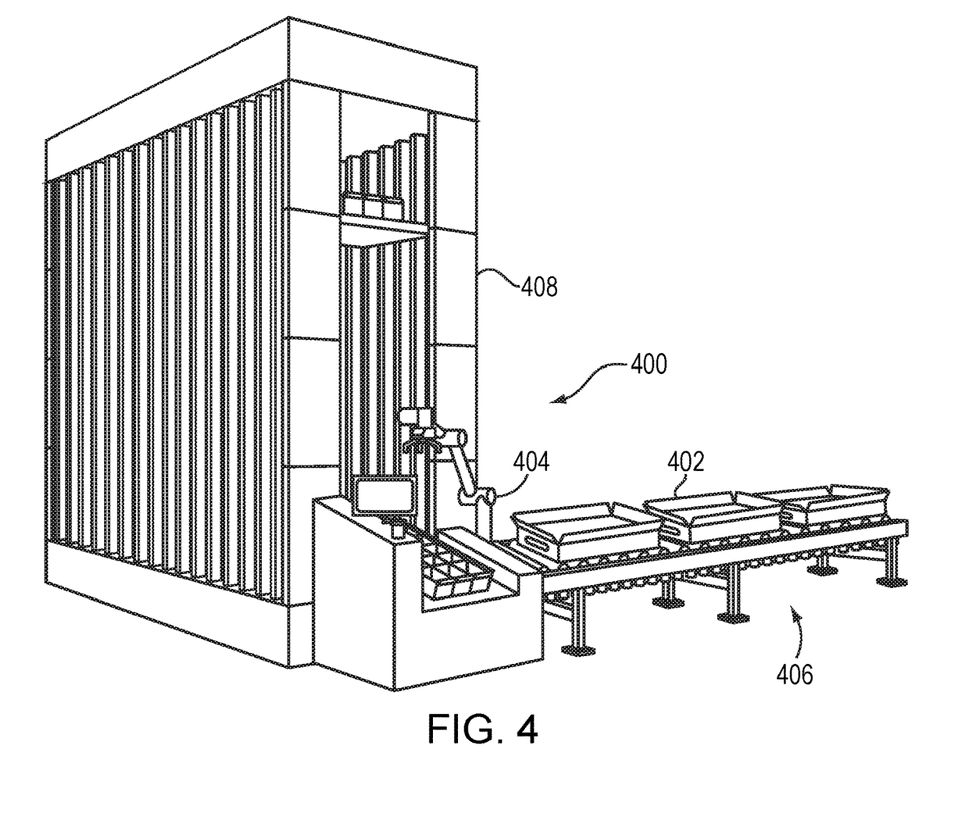
FIG. 4 illustrates a robotic manipulator in accordance with another embodiment.

FIG. 4, for example, illustrates an interaction point 400 in which boxes 402 of items are brought to a robotic manipulator 404 via a transportation system 406 of conveyor belts. Once the items are at the interaction point 400, the robotic manipulator 404 may execute the grasp attempts and place them in a container 408 for shipment or for further storage.

As discussed above, the robotic manipulator 204 may also travel to the interaction point to grasp the items. To that end, the robotic manipulator 204 may be configured with transportation devices 220 such as those shown in FIG. 3.

Once the robotic manipulator 204 and the item(s) to be grasped are at the interaction point, the robotic manipulator 204 may perform one or more grasp attempts in accordance with a grasping strategy. The robotic manipulator 204 may perform several grasp attempts to determine the effectiveness of a particular grasping strategy.

In the context of the present application, "grasping strategy" or "grasp strategy" may refer to the steps, movements, applied force(s), approach, and other characteristics that define how the robotic manipulator 204 executes a grasping attempt. These actions may also include sensing actions, signal processing actions, planning, execution, validation, as well as parameters of all of these actions.

Referring back to FIG. 2, the picking coordination system 202 may be configured with a processor 232 executing instructions stored on memory 234 to provide a planning module 236. The processor 232 of the picking coordination system 202 may be configured similarly to the processor 214 of the robotic manipulator 204 described above.

The processor 232 may execute instructions stored on the memory 234 to provide the planning module 236 to generate grasping strategies to be executed by the robotic manipulator 204. For example, the planning module 236 may define various parameters of a grasping strategy such as how the arm device 210 and the end effector 212 are to approach an item, how wide the end effector 212 should open its "hand," how imagery should be processed, how much force should be generated by the end effector 212 to grasp the item, or the like. Parameters and instructions defining the generated grasping strategy may then be communicated to the robotic manipulator 204 for execution.

The system 200 and, namely, the picking coordination system 202, can use a number of criteria to determine when to perform the test. It can receive an explicit command from an operator to start/stop testing and/or it can use a settable time window such as at night or during other inactive periods. It can also use a locally-evaluated criteria such as during periods of idleness or when it receives an update of inventory from the WMS 228, among other criteria.

Similarly, the system 200 can abort any testing and data gathering procedures based on a variety of criteria such as a specific interrupt signal from the ASRS 224 or the WMS 228. The system 200 may then return to perform primary distribution picking operations. The system 200 may also operate opportunistically to test items of interest when they are already brought to the system 200 for order fulfillment.

To execute the testing process, the picking coordination system 202 may communicate to the ASRS 224 to indicate the items to be tested. The system 202 may also communicate a number of different arrangements of containers that are used in the graspability testing processes. This can include recalling the same container or another container as the destination for picking items.

Additionally or alternatively, the robotic manipulator 204 can keep the same container at the interaction point throughout the entire data gathering process. Items can then be picked, the grasp success and/or stability determined, and the items can be returned to the same container. This is advantageous because it simplifies the process of returning items to inventory.

Figure 5:
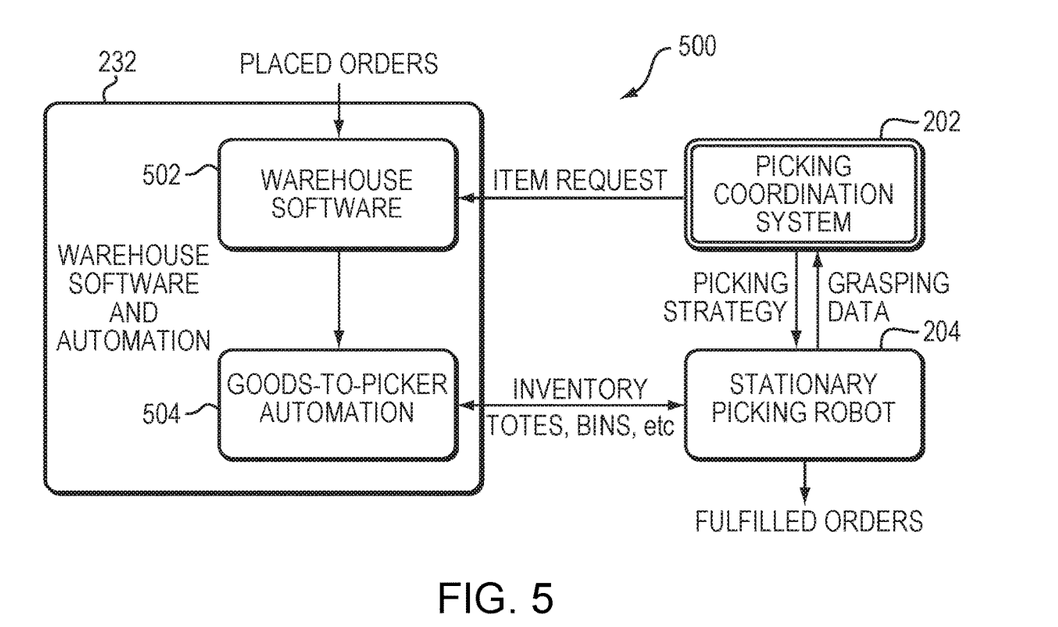
FIG. 5 depicts a flowchart of an items-to-picker workflow in accordance with one embodiment.

FIG. 5 illustrates a flowchart 500 of a goods-to-picker workflow in accordance with one embodiment. In this embodiment, the picking coordination system 202 may issue one or more item requests to the warehouse software and automation system 232. Specifically, any requests may be received by the appropriate warehouse software 502, which also may receive commercial orders.

The request may indicate the location of the item(s) within the warehouse. Additionally or alternatively, the warehouse software 502 may search a database module 238 of FIG. 2 to learn the location of the requested item(s). Any appropriate goods-to-picker automation systems 504 may then transport the required items from a first location (e.g., storage) to a second location (e.g., an interaction point) to a robotic manipulator 204. In this embodiment, the robotic manipulator 204 is a stationary picking robot.

The picking coordination system 202 may at any time communicate the grasping strategy to the robotic manipulator 204. Once the items are brought to the robotic manipulator 204, the robotic manipulator 204 can execute the strategy.

Figure 6:
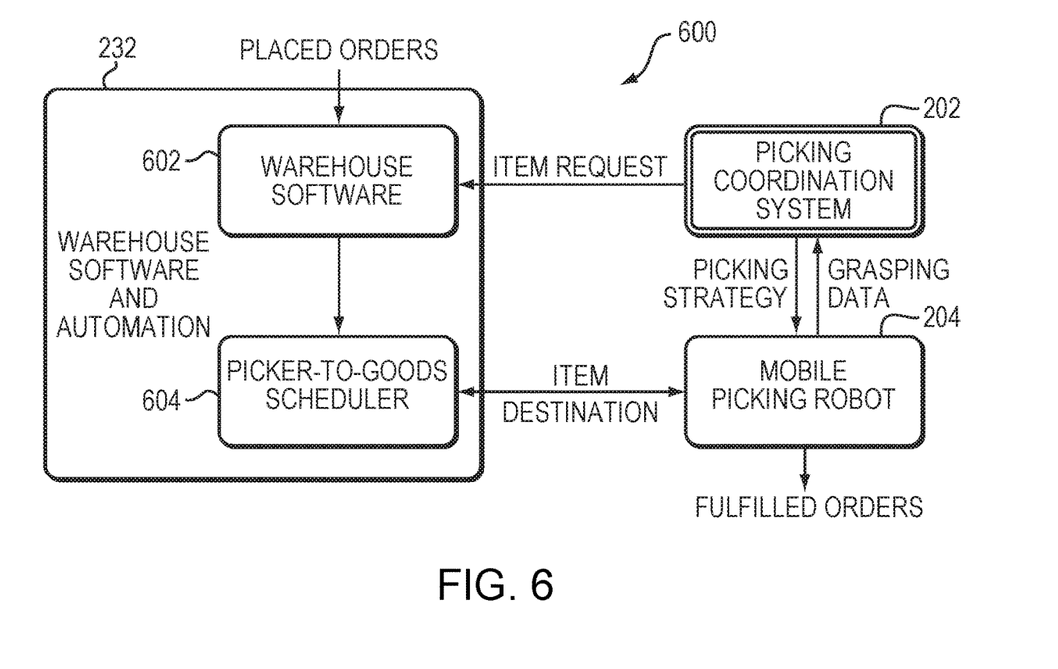
FIG. 6 depicts a flowchart of a picker-to-item workflow in accordance with one embodiment.

FIG. 6 illustrates a flowchart 600 of picker-to-goods workflow. In this embodiment, the picking coordination system 202 may issue one or more item requests to the warehouse software and automation system 232. Specifically, any requests may be received by the appropriate warehouse software 602, which may also receive commercial orders.

The request may indicate the location of the item(s) within the warehouse. Additionally or alternatively, the warehouse software 602 may search the database module 238 of FIG. 2 to learn the location of the requested item(s). A picker-to-goods scheduler 604 may then instruct the robotic manipulator to travel to the item. As in FIG. 2, the robotic manipulator 204 may be configured with a transportation device to transport the robotic manipulator 204 from a first location to a second location (e.g., an interaction point) that stores the item.

The picking coordination system 202 may at any time communicate the picking strategy to the robotic manipulator 204. Once the robotic manipulator 204 (which in this embodiment is a mobile picking robot) travels to the items, the robotic manipulator 204 can execute the strategy.

It is noted that items can also be presented manually to the robotic manipulator 204—either fixed-based or mobile. An operator may provide a plurality of bins or containers of items to be picked/tested to the manipulator 204, or the operator can direct a manipulator 204 to a plurality of locations on a shelf, racks of bins, or similarly storage means.

The selection of items to test can be made by the picking coordination system 202, the robotic manipulator 204, the warehouse software and automation system 230, or by a human operator. The robotic manipulator 204 may return the items to their original containers, or transfer them to new containers as part of the graspability testing. The operator may or may not communicate information about the items to the robotic manipulator 204, and the gathered data may be transferred manually or automatically to the picking coordination system 202 and/or the infrastructure management system 206. This data may then be integrated with any suitable databases or with the cloud-based picking coordination system 202 to improve future picking operations.

The robotic manipulator 204 may then execute the grasping strategy on any number of items. Generally, an execution involves the robotic manipulator imaging the items in a container, preforming any required sensing, signal, or image processing to define one or more items to be grasped, attempting to grasp the item in accordance with one or more parameters, evaluating the grasp attempt (e.g., determining if the item was successfully lifted), and optionally shaking the end effector 212 and the item to determine stability under disturbance.

In some embodiments, the grasping strategy may only involve partial execution of the grasping process. For example, some grasping strategies may only require the imaging portion of the process to reveal how well specific items can be imaged with the selected sensor device(s) 218. These partial grasping strategies can also include signal and/or image processing steps and grasp planning aspects to assess how well the corresponding components can perform.

In some embodiments, the grasping strategy may involve grasping the item but not lifting the item. This may provide helpful information related to tactile sensor signals. In other embodiments, the grasping strategy may also involve lifting the item. To determine if the item is lifted, the end effector can be imaged to see if the item was successfully lifted.

Additionally or alternatively, any sensor devices 218 configured with the end effector 212 or arm device(s) 210 can detect the item weight. Similarly, the item can be placed on a scale provided for this purpose. Or, there may be sensor devices located under the source or destination container to detect whether an item has been removed from or placed thereon.

In some embodiments, the robotic manipulator 204 may be configured to perform non-prehensile probing of the items. In the context of the present application, "non-prehensile probing" may refer to the acts of touching items without the intent of grasping. Non-prehensile probing may be useful to generate additional views of the items or to confirm item calibration and/or object stiffness or material.

In some embodiments, the grasping strategy may involve "stirring" the items in a container or tilting the container to determine how the items interact with each other and the container walls. Also, the detection and localization of barcodes or other indicia using a sensor device 218 can provide information about the movement of target items.

The robotic manipulator 204 and its sensor devices 218 may gather a variety of data during testing. This data may include image data related to the item(s) and the grasp attempt(s) such as whether an attempt was successful. This image data may include monochrome, color, hyperspectral, depth/point-cloud, and other types of data as well as combinations thereof. The types of image data gathered may of course vary on the type and configuration of the sensor device(s) 218.

Sensor devices such as accelerometers, joint encoders, and potentiometers may gather data regarding spatial position and the motion of the arm device(s) 210 and transportation device(s) 220. Sensor devices such as force-torque sensors or tactile located in or otherwise configured with the robotic manipulator 204 may gather data regarding applied force and item mass.

Additionally, the system 200 may include a scanner configured with or external to the robotic manipulator 204 to gather geometry information of an item. These scanners may operate based on triangulation, stereo imaging, or the like. These scanners or other types of sensor device(s) 218 may gather data related to grasp success rates and data used for grasp stability estimation.

The data gathered as a result of the grasp attempt(s) may be stored in a database module 238 and/communicated to the picking coordination system 202 and the infrastructure management system 206. The planning module 236 may further process this data to characterize expected future performance of a robotic manipulator 204. For example, this data may provide insight as to the pick time, error rate, or the like on a particular item given a particular grasp strategy.

This data may also be communicated to operators or other interested parties to inform the operators of grasp failures and the reason(s) for such failures. This information can then help improve performance. For example, an item or grasping strategy with a relatively high error rate may be selected more often for future tests, and future grasping strategies or parameters thereof can be altered in an effort to improve performance. Parameters that may be varied may include, for example, vision segmentation, model building, grasp location selecting/planning, grasp control, or the like.

Figure 7:
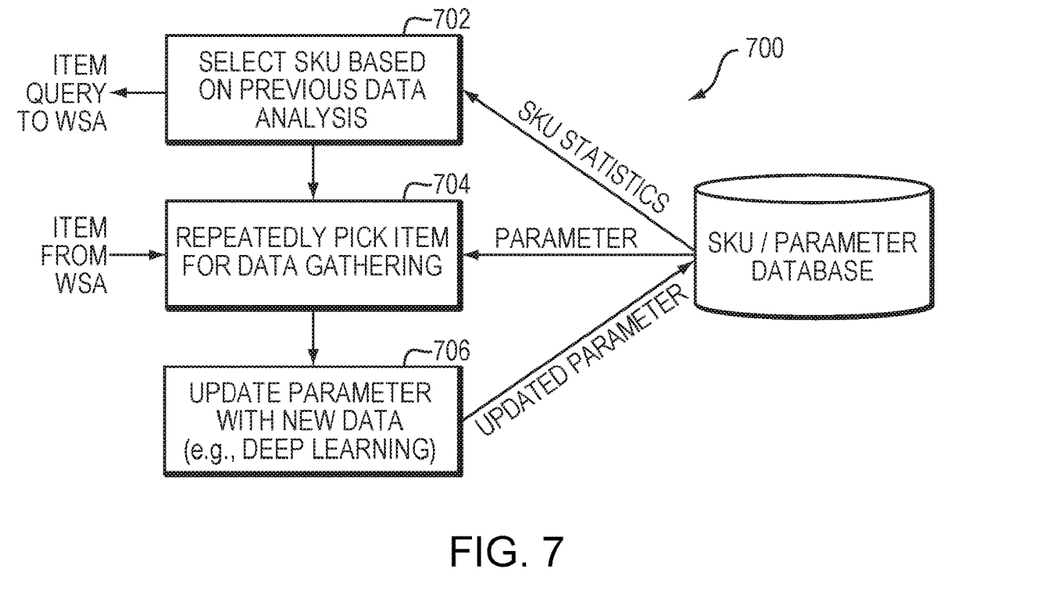
FIG. 7 depicts a flowchart of a grasp testing workflow in accordance with one embodiment.

FIG. 7 depicts a flowchart 700 showing the flow of data during testing. Specifically, FIG. 7 shows that, during item selection and data gathering, one or more optimization algorithms may be executed by the planning module 236 to optimize parameters of the grasping strategy.

In step 702, the picking coordination system 202 selects one or more items for testing based on statistics stored in the database module 238. It is noted that in FIG. 7 the picking coordination system 202 may gather statistics related to and request items based on stock keeping units (SKUs). SKUs may refer to an identification designation for a particular item or type of item.

One or more SKUs may be selected based on results of previous grasp attempts. For example, if a particular SKU (i.e., an item) has a high failure rate (i.e., there has been a relatively low amount of successful grasps), then that item may be a suitable candidate for testing.

Step 704 involves repeatedly picking or otherwise repeatedly attempting to grasp the item. The repeated attempts may be in accordance with a grasping strategy defined by one or more parameters.

Step 706 involves updating one or more parameters upon the receipt of new data resulting from the grasp attempt(s). Ideally, the updated parameter will help improve grasp performance.

For example, one particular grasp strategy may have a learned classifier that predicts whether or not a grasp will fail based on sensor data. Parameters of this classifier can be adjusted based on new pick attempts and their success rates. Any required analysis can be performed locally on processors 214 and/or 232 or on components in a local facility.

Alternatively, the data can be uploaded to a central server or cloud server for remote analysis and data mining. These servers may be provided by the robotic manipulator vendor and/or by the ASRS 224 or WMS 228 operator, for example.

Embodiments described herein can utilize a wide range of machine learning methods to update these grasping strategy parameters. In some embodiments, the planning module 236 may compute the gradient of a cost function (e.g., the probability of success) with respect to certain parameters (e.g., the finger positions) on the collected data. This method, known as (stochastic) gradient descent, is depicted in FIG. 8 as a flowchart 800.

Figure 8:
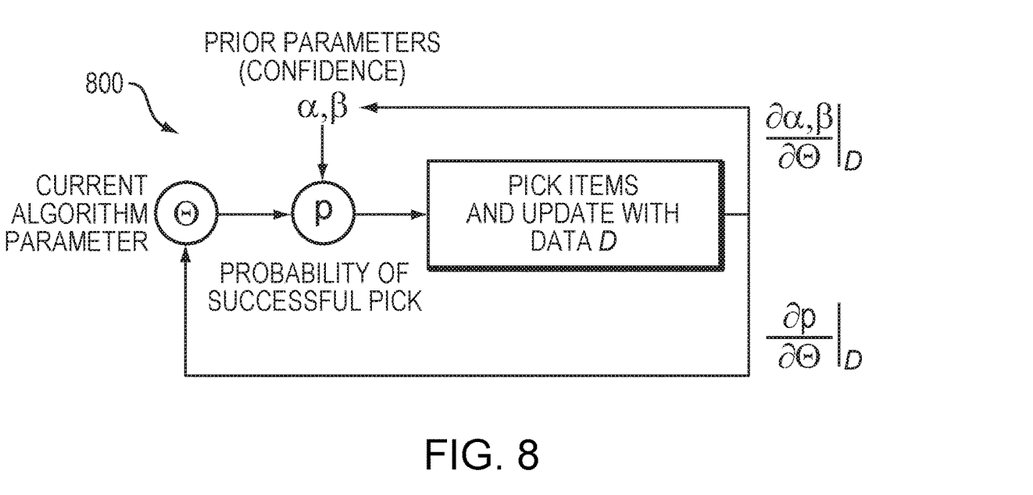
FIG. 8 depicts a flowchart of a parameter optimization procedure in accordance with one embodiment.

In FIG. 8, an algorithm parameter is denoted by θ and the current confidence parameters, which may be related to how many times the item has been grasped or attempted to be grasped, may influence the estimate of the probability of success. Once a grasp attempt is executed, the predicted value can be compared with the truth value (whether or not the item was successfully grasped) and the appropriate parameters can be updated by computing the derivative of this function.

These gradient-based approaches, common in deep learning, are relatively easy to implement given existing automatic differentiation tools (e.g., TensorFlow®) and do not require full Bayesian models of each parameter. Regardless, other optimization algorithms can be used to update the parameters. For example, techniques such as Markov Chains, Monte Carlo simulations, and variational inference and evolutionary strategies can be used.

It is noted that parameters for new planning strategies can be estimated quickly based on existing parameters. This may be advantageous when a new item is encountered that is similar to an item that has already been tested.

For example, if a new cellular phone from a particular company is released and includes similar packaging to an earlier model, the grasping strategy required for successful grasps for the new model will likely be similar to those required for the earlier model. Accordingly, grasping strategies for and other information related to the earlier model may be used as a starting point.

This knowledge transfer, generally known as transfer learning, may be used to "bootstrap" new strategies. The attributes of earlier items can then be embedded in a low-dimensional representation metric. Parameters for similar items can therefore rely on these metrics as starting values for new parameters and new items.

These bootstrapping techniques inevitably reduce training time. Further, these techniques can be used to quickly select parameters for newly developed planning strategy elements (e.g., a new image segmentation algorithm) that has similar parameters to a previous strategy.

In addition to the techniques described above, other machine learning methods may be used to accomplish the various features described herein. These include classification techniques such as clustering and support vector machines, and estimation techniques such as Kalman filters and maximum likelihood methods.

Figure 9:
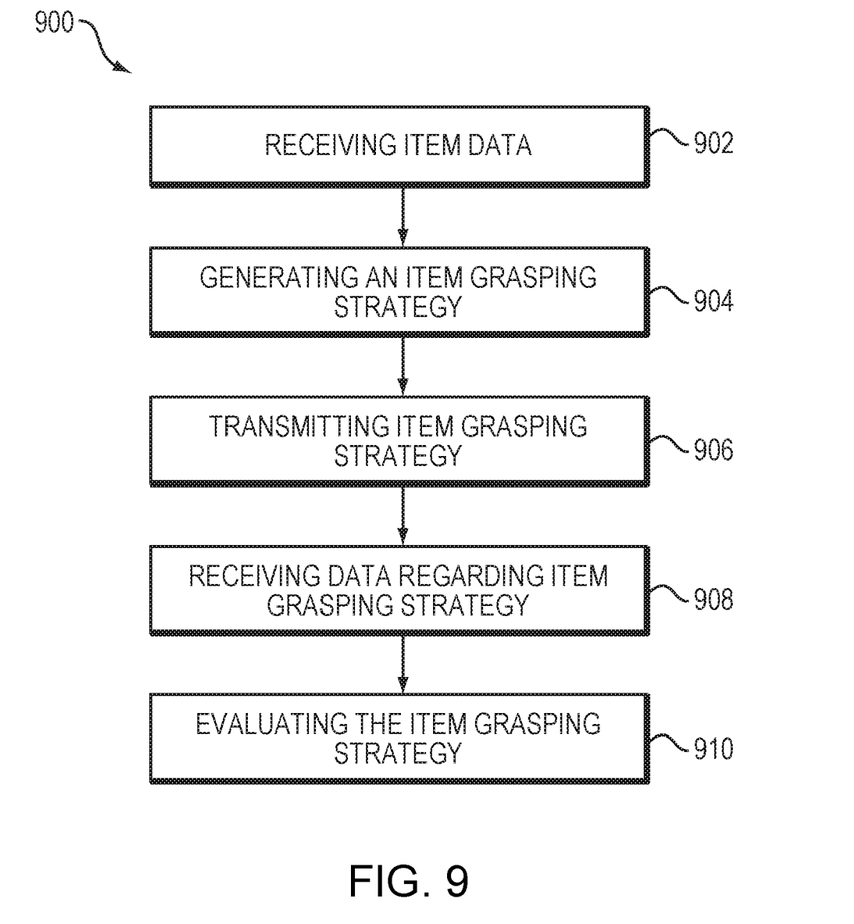
FIG. 9 depicts a flowchart of a method of training a robotic manipulator in accordance with one embodiment.

FIG. 9 depicts a flowchart of a method 900 of training a robotic manipulator in accordance with one embodiment. The method 900 may be performed by components such as those illustrated in FIG. 2.

Step 902 involves receiving data regarding an item from a first sensor device. This data may include data such as size data, shape data, material data, and weight data related to the item. This data may also include data regarding previous grasping attempts with respect to the particular item and/or grasping strategy.

Step 904 involves generating, using a processing device executing instructions stored on a memory to provide a planning module, an item grasping strategy to be executed by the robotic manipulator to grasp the item. This processing device may be similar to the processors of FIG. 2, for example. The planning module may generate an item grasping strategy to be executed by the robotic manipulator. The grasping strategy may be defined by one or more parameters such as, but not limited to, manipulator position before grasping, pre-grasp manipulations, image processing technique(s), responses to feedback from the sensor device, or the like.

Step 906 involves transmitting the item grasping strategy to a robotic manipulator for execution. The item grasping strategy may be communicated over a network such as the network 208 of FIG. 2.

Step 908 involves receiving data regarding the execution of the item grasping strategy from a second sensor device. This data may be gathered during and/or after the time in which the robotic manipulator executes the item grasping strategy. This data may be communicated to the planning module over a network such as the network 208 of FIG. 2.

Step 910 involves evaluating the item grasping strategy using the planning module and the data received from at least a second sensor device. This may include evaluating whether or not the robotic manipulator successfully grasped (and held onto) the item as a result of executing the item grasping strategy. This data may then be used to assist in improving future manipulator performance by altering one or more parameters of the item grasping strategy.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of training a robotic manipulator, the method comprising:
   receiving data regarding an item from a first sensor device;
   generating, using a processing device executing instructions stored on a memory to provide a planning module, an item grasping strategy to be executed by the robotic manipulator to obtain an initial grasp on the item, wherein the item grasping strategy is defined by a probability parameter that is related to a number of previous initial grasp attempts;
   transmitting, to a robotic manipulator for execution, the item grasping strategy;
   receiving data regarding the execution of the item grasping strategy from a second sensor device; and
   evaluating the item grasping strategy using the planning module and the data received from at least a second sensor device.

2. The method of claim 1 wherein the received data regarding the item includes at least one of size data, shape data, material data, and weight data.

3. The method of claim 1 further comprising:
   altering at least one parameter of the item grasping strategy to provide a corrective item grasping strategy based on the evaluation; and
   transmitting, to the robotic manipulator for execution, the corrective grasping strategy.

4. The method of claim 3 wherein the at least one parameter is selected from the group consisting of robotic manipulator position before grasping, pre-grasp manipulations, image processing technique, and response to feedback from the first sensor device.

5. The method of claim 1 wherein the robotic manipulator includes at least one of a robotic hand device, a suction device, and an adhesive strategy for executing the grasping strategy.

6. The method of claim 1 wherein evaluating the item grasping strategy includes determining whether the robotic manipulator grasped the item.

7. The method of claim 1 wherein the first sensor device and the second sensor device are the same device.

8. The method of claim 1 further comprising iterating the steps of:
   transmitting, to a robotic manipulator for execution, the item grasping strategy;

receiving data regarding the execution of the item grasping strategy from the second sensor device; and evaluating the item grasping strategy using the planning module and the data received from the second sensor device.

9. The method of claim 1 further comprising storing data regarding the success rate of the item grasping strategy in a database module.

10. The method of claim 1 further comprising selecting the item to be grasped based on at least one of previous grasp success rates and at least one physical characteristic of the item.

11. The method of claim 1 wherein transmitting the item grasping strategy to the robotic manipulator for execution includes transmitting the item grasping strategy to the robotic manipulator for execution during at least one of a weekend, an overnight period, and a lull period.

12. A system for training a robotic manipulator, the system comprising:

a robotic manipulator for grasping an item;

a first sensor device for gathering data regarding the item;

a second sensor device for gathering data regarding the execution of the item grasping strategy;

a processing device executing instructions stored on a memory to provide a planning module configured to:

generate an item grasping strategy to be executed by the robotic manipulator to obtain an initial grasp on the item, wherein the item grasping strategy is defined by a probability parameter that is related to a number of previous initial grasp attempts, transmit the item grasping strategy to a robotic manipulator for execution; and evaluate the item grasping strategy executed by the robotic manipulator using data received from the second sensor device.

13. The system of claim 12 wherein the data regarding the item includes at least one of size data, shape data, material data, and weight data.

14. The system of claim 12 wherein the planning module is further configured to alter at least one parameter of the item grasping strategy based on the evaluation to provide a corrective item grasping strategy, and the robotic manipulator is further configured to execute the corrective item grasping strategy.

15. The system of claim 14 wherein the at least one parameter is selected from the group consisting of robotic manipulator position before grasping, pre-grasp manipulations, image processing technique, and response to feedback from the first sensor device.

16. The system of claim 12 wherein the robotic manipulator includes at least one of a robotic hand device, a suction device, and an adhesive device for executing the grasping strategy.

17. The system of claim 12 wherein evaluating the item grasping strategy includes determining whether the robotic manipulator grasped the item.

18. The system of claim 12 wherein the first sensor device and the second sensor device are the same device.

19. The system of claim 12 wherein the robotic manipulator and the planning module are further configured to iterate the steps of generating the item grasping strategy, transmitting the item grasping strategy, and evaluating the item grasping strategy.

20. The system of claim 12 further comprising a database module for storing data regarding the success rate of the item grasping strategy.

21. The system of claim 12 wherein the item to be grasped is selected based on at least one of previous grasp success rates and at least one physical characteristic of the item.

22. The system of claim 12 wherein the robotic manipulator executes the grasping strategy during at least one of a weekend, an overnight period, and a lull period.

* * * * *